(12) United States Patent
Lozano et al.

(10) Patent No.: US 12,117,893 B2
(45) Date of Patent: *Oct. 15, 2024

(54) ERROR DOCUMENTATION ASSISTANCE

(71) Applicant: State Farm Mutual Automobile Insurance Company, Bloomington, IL (US)

(72) Inventors: Javier Lozano, Wylie, TX (US); William Luo, Garland, TX (US); Carlos Gonzalez, Allen, TX (US); Bing Lin, Allen, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,248

(22) Filed: Apr. 28, 2023

(65) Prior Publication Data
US 2023/0267031 A1 Aug. 24, 2023

Related U.S. Application Data

(63) Continuation of application No. 17/370,968, filed on Jul. 8, 2021, now Pat. No. 11,693,726.
(Continued)

(51) Int. Cl.
*G06F 11/07* (2006.01)
*G06F 18/214* (2023.01)
*G06N 20/00* (2019.01)

(52) U.S. Cl.
CPC ........ *G06F 11/079* (2013.01); *G06F 11/0772* (2013.01); *G06F 11/0793* (2013.01); *G06F 18/214* (2023.01); *G06N 20/00* (2019.01)

(58) Field of Classification Search
CPC ............ G06F 11/0793; G06F 11/0772; G06F 11/079; G06F 11/0766; G06F 11/3447
See application file for complete search history.

(56) References Cited

U.S. PATENT DOCUMENTS 5,446,880 A * 8/1995 Balgeman ............ G06F 16/258
707/999.009
7,475,286 B2 1/2009 Altaf et al.
(Continued)

OTHER PUBLICATIONS

Office Action for U.S. Appl. No. 17/370,968, mailed on Oct. 14, 2022, Lozano, "Error Documentation Assistance", 19 Pages.
(Continued)

*Primary Examiner* — Yolanda L Wilson
(74) *Attorney, Agent, or Firm* — Lee & Hayes, P.C.

(57) ABSTRACT

An error documentation system including tools to collect and analyze application error data for individual development teams and tools to share documented defects and solutions across development teams during any stage of development cycle. The system may receive and analyze event logs for error events triggered by applications on end-user devices. The system may automatically generate defect tickets and/or ticket entries for defects identified in event logs. The system may train one or more machine learning (ML) models to correlate input with identified defects from a defects database. In response to identifying correlated identified defects, the system may generate ticket entries indicating the correlated identified defects and associated solutions for the defects. The system may provide an interface for users to query the data stored in the database.

20 Claims, 6 Drawing Sheets

Related U.S. Application Data

(60) Provisional application No. 63/051,739, filed on Jul. 14, 2020.

(56) References Cited

U.S. PATENT DOCUMENTS

| | | | |
|---|---|---|---|
| 8,332,765 | B2 | 12/2012 | Ergan et al. |
| 9,275,358 | B1 | 3/2016 | Yap et al. |
| 9,710,122 | B1* | 7/2017 | Pillay .................. H04L 41/12 |
| 10,175,979 | B1 | 1/2019 | Elwell et al. |
| 10,489,283 | B2 | 11/2019 | Maczuba |
| 10,528,454 | B1 | 1/2020 | Baraty et al. |
| 10,565,077 | B2 | 2/2020 | Hayden et al. |
| 10,572,374 | B2 | 2/2020 | Sharma et al. |
| 10,635,409 | B2 | 4/2020 | Pradhan et al. |
| 10,740,216 | B1 | 8/2020 | Parent |
| 10,771,314 | B2 | 9/2020 | Misra et al. |
| 2004/0199828 | A1 | 10/2004 | Cabezas et al. |
| 2012/0246623 | A1 | 9/2012 | Creel |
| 2017/0046246 | A1 | 2/2017 | Kaulgud et al. |
| 2017/0344413 | A1 | 11/2017 | Chakra et al. |
| 2018/0121808 | A1* | 5/2018 | Ramakrishna .......... H04L 51/02 |
| 2019/0089577 | A1* | 3/2019 | Misra .................. G06N 20/00 |
| 2019/0347282 | A1 | 11/2019 | Cai et al. |
| 2020/0073738 | A1 | 3/2020 | Gaida |
| 2020/0293946 | A1* | 9/2020 | Sachan .................. G06N 5/04 |
| 2020/0304364 | A1* | 9/2020 | Tapia .................... G06N 7/01 |
| 2020/0409819 | A1 | 12/2020 | Acharyya et al. |
| 2022/0019496 | A1 | 1/2022 | Lozano et al. |

OTHER PUBLICATIONS

Office Action for U.S. Appl. No. 17/370,968, mailed Jun. 9, 2022, Lozano, "Error Documentation Assistance", 18 pages.

* cited by examiner

ERROR DOCUMENTATION ASSISTANCE

CROSS-REFERENCE TO RELATED APPLICATION

The present application is a continuation of and claims priority to U.S. patent application Ser. No. 17/370,968, filed on Jul. 8, 2021, which is a nonprovisional of and claims priority to U.S. Provisional Patent Application No. 63/051,739, filed on Jul. 14, 2020, which is incorporated herein by reference in its entirety.

BACKGROUND

In many organizations, individual development teams are often tasked with developing various applications and components for use by other teams within the organization. When it comes to addressing errors or "bugs" within the developed applications, the team that developed the application is typically also tasked with fixing such bugs so that the application can continue to be used. Accordingly, within the organization, each development team may utilize one or more respective databases to track and manage the various bugs associated with their applications and the corresponding fixes that the team develops. Although different development teams for the same or similar applications may share best practices with each other, when it comes to error documentation and solution finding, the databases described above commonly remain siloed within individual teams. Such siloed databases can result in the duplication of efforts and can reduce the efficiency of the teams as a whole, particularly as applications grow more complex and interdependent. Accordingly, there is a need for an error documentation system that could assist in documenting the errors and solutions across multiple teams to promote solution sharing.

SUMMARY

This disclosure is directed to an error documentation system, including an analysis tool configured to assist with collecting application defect data triggered by error events and a query tool configured to share defect data and solutions. The error events may be triggered by computer errors (e.g., null pointers, code exceptions, etc.) or triggered by preconfigured rules for alerts. In some examples, the preconfigured rules may include rules generated by operators (e.g., software developers) to track specific events occurring on their application. In additional examples, the system may use a logging tool to assist the analysis tool with data collecting. In response to the error event, the logging tool may log metrics from the applications running on end-user devices and may push the metrics to a data repository (e.g., a cloud server) for analysis. In some examples, an end-user device may include any user device able to execute the application and may include a developer testing device during any stage of development cycle for the application.

In various examples, the error documentation system may document individual error events as event logs and may generate log identifiers to associate with the event logs. An event log, which includes the data logged for the error event, may be tagged or otherwise associated with a respective log identifier (e.g., writing the log identifier to the metadata). The system may analyze the event log to determine if the error event is associated with a new unidentified defect or an existing identified defect. If the error event is associated with an unidentified defect, the system may generate a new defect ticket.

In various examples, the system may automatically generate and/or populate information on a defect ticket. The system may populate a defect ticket with information gathered based on analyzing the event log and additional information inferred. The information may include but is not limited to an error type, an error message, a timestamp, a user identifier, a response, a stack trace, an exposed endpoint, an identifier for a line of code, an application and/or application component that triggered the alert, developer identifier (e.g., name of a coder or a team lead), end-user device type, operating system, related and/or dependent applications, infrastructure defect, defect identifier, severity level, priority level, tasks, correlated defects, correlated solutions, and the like.

In some examples, the system may generate a task to review a ticket and may automatically publish notifications to any subscribers (e.g., project managers, developers, quality assurance members, operators, etc.). If the error event is associated with an identified defect, the system may append the input event log to the existing defect ticket by adding the log identifier to the ticket. In various examples, the system may determine whether the identified defect is resolved or unresolved based on whether a solution is found, as indicated on the ticket. In some examples, if new event log information is added to an unresolved defect ticket, the system may automatically generate a notification to alert a subscriber to review the new event log. In various examples, the system may escalate a ticket by automatically increasing the priority level of the ticket based on a predetermined criterion. The criterion may include determining that the number of event logs added to the defect ticket has exceeded a threshold escalation count.

In various examples, the error documentation system may train one or more machine learning (ML) models using training data from stored event logs and defects databases to classify input data based on correlated defects. The ML models may use the training data to learn various error patterns and corresponding solutions to generate suggested solutions. In some examples, the ML models may provide a suggested solution for a new defect found in a first application based on a verified solution for an identified defect found in a second application. In some examples, the error documentation system may provide a query tool, including a chatbot, for operators to query the defects database for similar defects and solutions. In additional examples, the error documentation system may automatically generate a suggested solution entry, add it to the defect ticket, and publish a notification for a subscriber to review the suggested solution.

Implementations of the techniques and systems described herein can improve existing error documentation technologies and related systems. In particular, the implementations described herein enable an error documentation system to assist operators in gathering defect data, analyzing the defect data, generating defect tickets, and populating the tickets with the gathered information. Additionally, the system provides a query tool for different teams to share their identified defects and solutions. Moreover, the system may train ML models to classify input data by correlating the input data with identified defects based on patterns and may suggest correlated solutions based on fixes identified in correlated defect data. By classifying and correlating defect data, the system improves the error documentation process by timely analyzing and identifying defects from input data, automatically generating defect tickets, and populating the tickets with information extracted from the input data, including any correlated defects and/or solutions. The aforementioned process can reduce costly development time associated with ticket writing and information gathering. Additionally, by correlating defect data from different application teams, the system can minimize the costly development time associated with the error fixing process by sharing documented resolutions across the different application teams. Implementations of this disclosure can also conserve resources, such as processing resources, for example, by refraining from performing repeat defect analysis and/or repeat solution-finding. These techniques will be described in more detail below.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
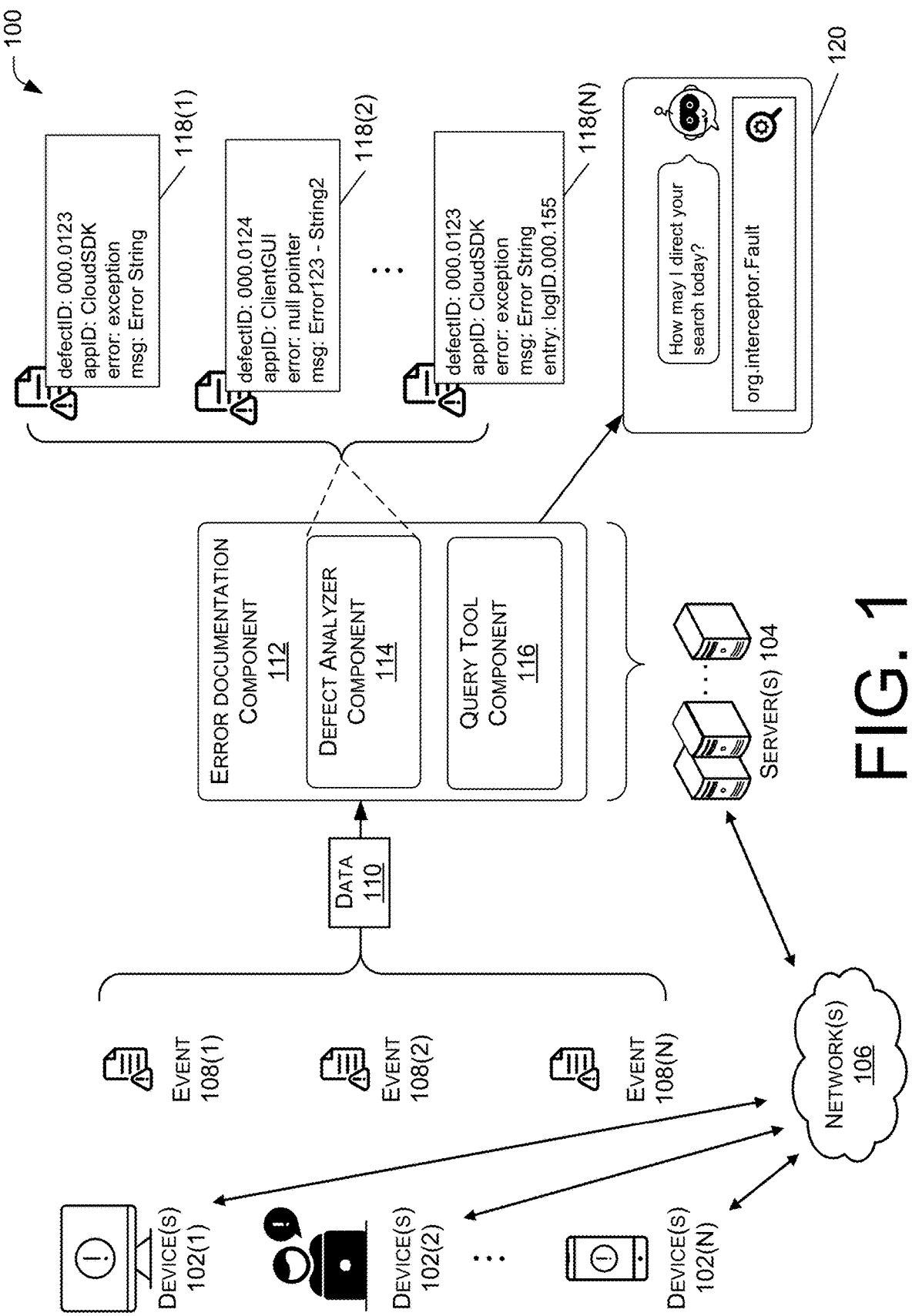
FIG. 1 illustrates an example error documentation system, including an analysis tool and a query tool.

FIG. 1 illustrates an example system 100 (e.g., an error documentation system), including an analysis tool and a query tool. In some examples, the analysis tool may be configured to analyze application error data and to extract defect information from such data. Additionally, in some examples, the query tool may be configured to facilitate sharing such defect information and/or documented errors among various groups within an organization. As shown in FIG. 1, the system 100 may include one or more device(s) 102(1)-102(N) (individually and/or collectively referred to herein as "devices 102," where N is any integer greater than or equal to 2) and one or more server(s) 104.

In various examples, the error documentation system 100 can include any number of devices 102 and servers 104 to assist in error data collecting, analyzing, and sharing. The error documentation system 100 may be configured to provide error documentation assistance to operators ("users"), from one of the multiple development teams, working on different application components executing on the devices 102 associated with end-users. The end-users may include any users, including, but not limited to, testers, developers, beta-testers, development team members, production team members, agents, subscribers, clients, and the like.

The devices 102 may be configured to log data triggered by error events that are pushed to one or more server(s) 104. The devices 102 can be any type of computing device, including but not limited to a laptop, a desktop computer, a tablet computing device, a server, a kiosk device, a smartphone, and the like. The device(s) 102 may include an application that includes a logging tool that may log data triggered by error events and may push data to the server(s) 104 and/or any interim data repository. The application and/or any component of the application may be in any stage of a software development cycle, including a development stage, a beta stage, a production stage, and the like. The device(s) 102 may communicate with the server(s) 104 through any network(s) 106.

The server(s) 104 may include any number and combination of devices, including but not limited to, laptops, desktop computers, servers, and the like. The server(s) 104 can include any number of devices and/or computing resources on local servers and/or cloud servers that are accessed over an appropriate data communications network(s) 106.

The server(s) 104 can include an error documentation component 112 and associated components. As described herein, the error documentation system 100 may be configured to provide error documentation assistance on different application components. The error documentation component 112 may be configured to collect event logs from the different application components, parse data included in the event logs to identify defects and extract relevant information, and share the error data.

In some examples, the error documentation component 112 may be configured to receive data (e.g., data 110) associated with error events from the devices 102 and analyze the data for defects and defect information. In various examples, the data may include a data stream that is being pushed to the server(s) 104 in real-time, or in near real-time. The example data 110 could include event logs 108(1)-108(N) (individually and/or collectively referred to herein as "event logs 108," where N is any integer greater than or equal to 2) triggered by error events from one or more applications and/or application components running on the devices 102. In various examples, the error documentation component 112 may receive an event log and generate a log identifier to identify the event log. The error documentation component 112 may tag, or otherwise associate, the metadata of the event log with the log identifier (e.g., writing the log identifier to the metadata). By tagging the metadata with the log identifier, the error documentation component 112 may reference the event log by indicating its log identifier from a defect ticket and may search for the event log as needed for further analysis. As illustrated, the error documentation component 112 can include a defect analyzer component 114 and a query tool component 116, which are described in turn.

The defect analyzer component 114 may analyze an input event log and determine an input defect associated with the input event log, as described herein. In some examples, the defect analyzer component 114 may analyze the input event log in real-time or in near real-time, and the system may notify a subscriber with analysis information. For example, the defect analyzer component 114 may parse the event log and extract relevant defect information from the event log. For example, an event log may include an error message and/or stack trace, and the defect analyzer component 114 may parse the strings of the error message and/or stack trace to identify extracted information. The extracted information may include error types (e.g., code exceptions, null pointers, SDK issues, etc.), error code, error messages, stack traces, time stamps, runtime, the response time of requests, exposed endpoints, hashtags and/or other indicators, application identifiers, software version identifiers, application component identifiers, developer identifier(s) (e.g., developer(s) of the code), infrastructure defect, end-user device types, operating system, and the like. In various examples, a software version identifier may include an indicator of the stage of the software development cycle and the defect analyzer component 114 may determine the stage. In a non-limiting example, the software version identifier may include strings "DEV_," or "BETA" to indicate the application is in a development stage or a beta stage, respectively. In some examples, the defect analyzer component 114 may infer additional relevant defect information based on the extracted information using look-up tables and/or machine learning (ML) models. The inferred information may include related and/or dependent applications, developer identifier(s) (e.g., name of application team lead(s)), defect identifier, severity level, priority level, tasks, correlated defects, correlated solutions, and the like. Accordingly, the relevant defect information may include both extracted and inferred information and may be included on a defect ticket to assist development teams in documenting defects and solutions.

In various examples, the defect analyzer component 114 may determine whether or not the input defect has previously been identified. The defect analyzer component 114 may determine whether the input defect correlates with previously identified defects from a defects database. In some examples (e.g., examples in which the defect analyzer component 114 determines that the input defect does not match or otherwise correlate with a previously identified defect included in the defects database), the defect analyzer component 114 may determine the input defect is an unidentified defect and generate a new defect ticket. The defect analyzer component 114 may populate the new defect ticket with information extracted from the event log. In additional and/or alternate examples, the defect analyzer component 114 may determine the input defect matches an identified defect based on the correlation. In response to identifying a match, the defect analyzer component 114 may append the event log to the defect ticket by adding an entry citing the log identifier. The defect analyzer component 114 and associated processes will be discussed herein, in greater detail, with respect to FIG. 2.

The query tool component 116 may generate a user interface to allow a user to browse the defects database, as described herein. In some examples, the query tool component 116 may include a chatbot to interact with and guide the user. In response to the user input of an error type or message, the chatbot may identify and link the most common solution if multiple solutions could be located.

As a non-limiting example, the example event logs 108 are used to illustrate the data flow for example data 110 received by the error documentation component 112. In the present example, in response to an example error event triggered at each device(s) 102, the event logs 108 are pushed to the server(s) 104. The server(s) 104 may receive the event logs 108 at different times or together as the example data 110. The error documentation component 112 may analyze the example data 110 and determine the defect and defect information. The example defect information 118 may include first example defect information 118(1), second example defect information 118(2), and third example defect information 118(N).

A first example event log 108(1) may be triggered by an error event on an application running on the device(s) 102(1). The error documentation component 112 may receive the first example event log 108(1), and the defect analyzer component 114 may determine the first example defect information 118(1). The error documentation component 112 can generate a ticket to document the first example defect information 118(1) and indicate the defect identifier. The first example defect information 118(1) includes the ticket identifier, application identifier, the error type, and message.

A second example event log 108(2) may be triggered by an error event on an application running on the device(s) 102(2). The error documentation component 112 may receive the second example event log 108(2), and the defect analyzer component 114 may determine the second example defect information 118(2). The error documentation component 112 may generate a ticket to document the second example defect information 118(2). The second example defect information 118(2) may indicate a new defect found with a different defect identifier.

A third example event log 108(N) may be triggered by an error event on an application running on the device(s) 102(N). The error documentation component 112 may receive the third example event log 108(N), and the defect analyzer component 114 may determine the third example defect information 118(N). The error documentation component 112 may determine the defect associated with the third example event log 108(N) is an existing identified defect and determine to append the log identifier for the third example event log 108(N) to the identified defect ticket.

In the present non-limiting example, the error documentation component 112 may receive the example data 110 logged for the example event logs 108 at different points in time. In response to receiving and documenting the data 110, the error documentation component 112 may determine whether to notify one or more users about the documentation and/or about a follow-up review or remedial action to take. In additional examples, the query tool component 116 may generate a user interface, including the example chatbot UI 120 to receive query input from a user. The example chatbot UI 120 may receive user input of error type or message and return the associated solutions.

The techniques and systems described herein improve existing error documentation technologies and related systems by assisting in documenting the errors and solutions across multiple teams to promote solutions sharing. In particular, the error documentation component 112 may collect event logs from the devices 102. The error documentation component 112 may include the defect analyzer component 114 and the query tool component 116. The defect analyzer component 114 may analyze the event logs to identify the defects and defect information to assist in documenting the defects on defect tickets. This documentation assistance can reduce costly development time associated with ticket writing and information gathering. The query tool component 116 may provide a user interface to receive query inputs to search for defects and retrieve documented solutions from a shared database to promote solutions sharing across teams.

Figure 2:
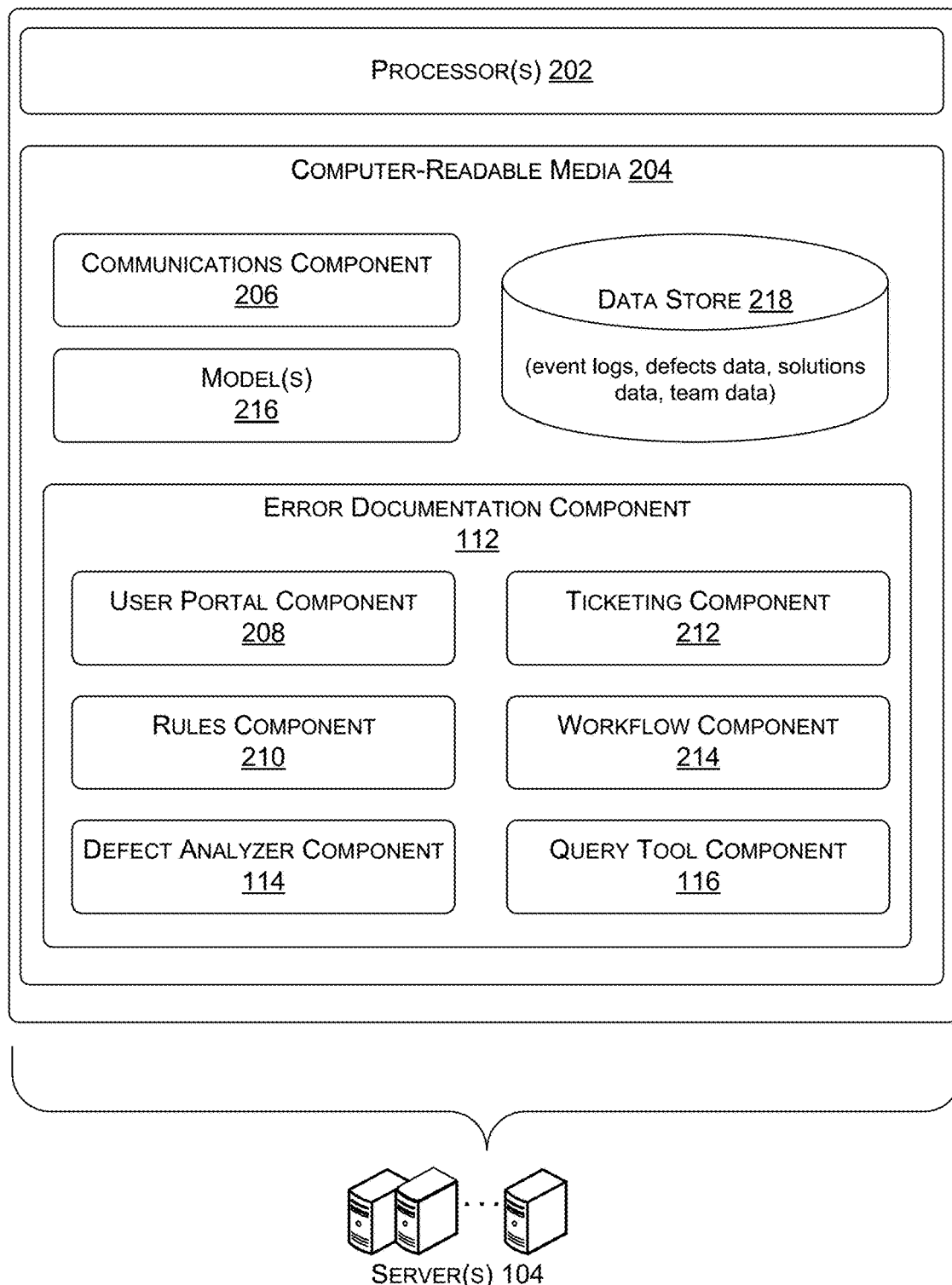
FIG. 2 is a block diagram of an example computing architecture associated with the system of FIG. 1.

FIG. 2 is a block diagram of an illustrative computing architecture 200 associated with the server(s) of the example error detection system 100. The computing architecture 200 may be implemented in a distributed or non-distributed computing environment.

The computing architecture 200 may include one or more processors 202, and one or more computer-readable media 204 that stores various components, applications, programs, or other data. The computer-readable media 204 may include instructions that, when executed by the one or more processors 202, cause the one or more processors 202 to perform the operations described herein.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some examples, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

As shown in FIG. 2, in some configurations, the computer-readable media 204 may store a communication component 206, the error documentation component 112 and associated components, model(s) 216, and a data store 218, which are described in turn. The components may be stored together or in a distributed arrangement.

The communication component 206 can include functionality to conduct communications with one or more other devices to collect data, as discussed herein. The communication component 206 can be configured to receive data (e.g., event logs) directly from an end-user device and/or receive data stored in an interim data repository. In some examples, the communication component 206 can include functionality to serve as a logging tool. The logging tool may include webhook functionality and may receive data stream, representative of metrics logged from error events triggered on the device(s) 102 via a communication session on the network(s) 106. In some examples, the data stream may be added to a log, in real-time or in near real-time. The error events may be triggered by computer errors (e.g., null pointers, code exceptions, etc.) or triggered by preconfigured rules for alerts. The preconfigured rules may include rules generated by operators (e.g., software developers) to track specific events occurring on their application. In response to the error event, the logging tool may log metrics from the applications running on end-user devices and may push the metrics to a server, in real-time or in near real-time, and/or data repository for analysis. In some examples, in response to the metrics being pushed to the server, in real-time or in near real-time, the system may notify a subscriber. In additional examples, the communication component 206 can be configured to receive stored event logs from a data repository. In various examples, the communication component 206 can conduct communication via the network(s) 106. In various examples, the communication component 206 can authenticate the data source(s) of the example data 110.

The error documentation component 112 may include a user portal component 208, a rules component 210, the defect analyzer component 114, a ticketing component 212, a workflow component 214, and the query tool component 116. In some examples, the error documentation component 112 may receive an event log and may generate a log identifier to tag a log identifier in the metadata of the event log. By tagging the metadata with the log identifier, the error documentation component 112 may reference the event log from a defect ticket and may search for the event log when needed for further analysis. The error documentation component 112 may process the event log to extract information relevant to error documentation, create tickets and/or entries to document the errors and solutions found and provide a tool to share the data. In various examples, the error documentation component 112 and/or associated components may execute as part of a standalone application or as an API in a browser.

The user portal component 208 may generate a user interface for creating application teams and/or user accounts, document errors and solutions for the applications, and provide a query tool for error data. In some examples, the user portal component 208 may be configured to track application teams, users assigned to the teams, and team roles held by the users. The users may include any human operators with permission to access the error documentation component 112, including application team members, project managers, analysts, administrative staff, product managers, studio leads, etc. An individual user account may be assigned to one or more application teams based on projects that the user is working on or has worked on. The user portal component 208 may identify the team role held by the user for each assigned development team.

The user portal component 208 may also manage user authorizations and/or user access levels. In some examples, a user may be authorized to access data related only to specific applications. In various examples, the user portal component 208 may provide user access to view stored defect data and/or solutions found through a user interface, as described herein with respect to FIG. 3. In some examples, the user accounts may be assigned a user access level with access to view only certain files and/or resources available to the team and/or user. For instance, a user account may have writing access to edit tickets based on the assigned team but may only have viewing access to other team's tickets. Additionally, certain leading team roles (e.g., project manager, lead developer, scheduler, etc.) may have higher user access level to edit portions of the ticket that a non-lead team role may not have, including creating/removing tasks, assigning/reassigning tasks, escalating/de-escalating a ticket, and the like.

In some examples, the user portal component 208 may include a subscription notification system for defect notification. In various examples, the user portal component 208 may automatically subscribe a user, via an associated user account, for notifications of events based on an application team associated with the user. In some examples, the user portal component 208 may allow a user to subscribe to notifications for specific error events related to a different application. A user account assigned to a specific application team may automatically subscribe to publications of changes to defect tickets related to the specific application, by a defect identifier, and/or by solutions found.

In various examples, the user portal component 208 may receive and store the preferred communication method and/or notification frequency for each user account. For instance, the user portal component 208 may notify a user based on specific changes to defects documentation, including a sudden surge of defects detected or detection of new defects with high severity (e.g., application crashing bugs). A severity level of the defect may be determined based on meeting a criterion or a rule (e.g., application crashing bugs are high severity, interface glitch bugs are low severity). The notification may be sent without delay if the defect has high severity, or it may be collected in a notification log and sent according to a notification frequency designated by the user preference.

In some examples, the user portal component 208 may provide an interface for a user to interact with the error documentation component 122 and associated components to view event logs and defect analysis. As described herein, data associated with a new event may be pushed from a device(s) 102 to the server for analysis in real-time or in near real-time; the user portal component 208 may determine one or more subscribers to notify about the new event. In various examples, the application and/or application component that triggered the new event may be in any stage of a software development cycle, including a development stage, a beta stage, a production stage, and the like. In response to a non-production stage, the user portal component 208 may serve as a debugger interface by notifying and/or triggering a view of a ticket for the new event for a user account associated with the device(s) 102 that pushed the data. For instance, during the development stage of an application, a developer associated with the user account may use the device(s) 102 to test a new build of the application, and the user portal component 208 may determine to notify the user account about the ticket and/or analysis results associated with the new event.

The rules component 210 may be configured to allow a user to create rules to trigger alerts. In some examples, the rules component 210 may include rules to populate a defect ticket with specific information, including users or groups of users to notify, defect type, severity level, and the like. The user may generate a rule that triggers an alert based on a function call from an application and may include a user and/or a group of users (e.g., backend developers on the application) to be notified when the alert is received based on the user-generated rule. When an event log is received in response to the trigger created by the user-generated rule, the rules component 210 may publish a notification to all subscribers.

As noted above with respect to FIG. 1, the defect analyzer component 114 may analyze the event log and identify the defect information from the event log. In some examples, defect analyzer component 114 may parse the event log and extract relevant defect information from the event log. For example, an event log may include an error message and/or stack trace, and the defect analyzer component 114 may parse the strings of the error message and/or stack trace to identify extracted information. The extracted information may include error types (e.g., code exceptions, null pointers, SDK issues, etc.), error code, error messages, stack traces, time stamps, runtime, the response time of requests, exposed endpoints, hashtags and/or other indicators, application identifiers, software version identifiers, application component identifiers, developer identifier(s) (e.g., developer(s) of the code), end-user device types, operating system, and the like. In some examples, the defect analyzer component 114 may infer additional relevant defect information based on the extracted information using look-up tables and/or ML models. The inferred information may include related and/or dependent applications, developer identifier(s) (e.g., name of application team lead(s)), defect identifier, severity level, priority level, tasks, correlated defects, correlated solutions, and the like. Accordingly, the relevant defect information may include both extracted and inferred information and may be included on a defect ticket to assist development teams in documenting defects and solutions.

In some examples, the defect analyzer component 114 may determine whether the defect has previously been identified or not. In various examples, the defect analyzer component 114 may interact with the ticketing component 212 to store and/or retrieve data or tickets from a defects database. The defect analyzer component 114 may use the event log and/or extracted information to determine whether the associated defect matches or correlates to an existing identified defect from a defects database. In some examples, the defect analyzer component 114 may use one or more models to classify input by known defects and to generate a confidence score for each classification. The one or more models may determine whether there is a matching or correlated defect from the database based on models that perform simple match and/or pattern correlation. For example, a matching model may perform a simple match by comparing strings in defects information, including application identifier, the error message header, the error type, and the like. In the present example, the defect analyzer component 114 may determine an input defect is a match, by exact or near exact match with a high confidence score, for an identified defect if they both occur on the same application with the same error type and the same error message header. In an additional example, a correlation model may perform pattern correlation by comparing the patterns of an input defect with patterns of identified defects and may generate a confidence score for each correlation. The pattern correlation may include but is not limited to: comparing similarities in the content of error messages, sequence logs, runtime, the response time of a request, sequence code, stack traces, exposed endpoints, and the like. For instance, the correlation model may use probabilistic classification to perform pattern recognition on an input defect and output a probability of the input defect being a match for the selected identified defect and output a confidence value associated with the selected identified defect. In the present example, the defect analyzer component 114 may determine an input defect is a match for an identified defect if the generated confidence score is at or above a high threshold. The defect analyzer component 114 may determine the input defect fails to match any identified defect and the ticketing component 212 to generate a new defect ticket for the input defect.

In some examples, the defect analyzer component 114 may train and use one or more correlation models to correlate an input defect to a defect identified in a defects database. As described herein, the defect analyzer component 114 may create training data for ML models by identifying sample data from a defects database. The trained ML model can comprise a classifier that is tasked with classifying input data (e.g., event log with unknown defect) by known defects (e.g., identified defects from a defects database) and may output a confidence score associated with the classification. The classifying may include pattern correlating, as described herein. As will be described with greater details herein with respect to the model(s) 216, the confidence score is generated by the trained ML model based on the classification method used and indicates a statistical probability for the classification. Accordingly, a low confidence score, defined by a confidence score that is at or below a low threshold, may indicate a low correlation; a high confidence score, defined by a confidence score that is at or above a high threshold, may indicate a high correlation (e.g., statistical likelihood for a near or exact match); and a confidence score that is between the high and low threshold may indicate a strong correlation but not a near or exact match.

In response to identifying a defect as a match for an existing identified defect, the defect analyzer component 114 may retrieve the ticket for the identified defect and append the event log to the defect ticket by adding an entry indicating the log identifier associated with the event log. The defect analyzer component 114 may also determine from the defect ticket if the ticket was marked "resolved" with a solution or if the ticket was marked "unresolved." As described herein, a ticket may be generated to automatically indicate "unresolved," and this indication may be changed to "resolved" manually by an operator. In various examples, if a defect ticket was marked resolved, the defect analyzer component 114 may determine if the ticket needs to be reopened based on the number of new defects added since the ticket was marked resolved. For instance, if a ticket was marked resolved, the defect should have been fixed, but if the defect analyzer component 114 adds a number of entries for new event logs above a threshold number to this ticket, the ticket may be reopened for defect review. In some examples, a ticket may be marked as "Do Not Fix" by a team member, and the ticket will not be reopened for defect review. The ticket marked as "Do Not Fix" may include defects deemed not worth fixing or may be dependent on a fix from a different software component.

In additional examples, the defect analyzer component 114 may increase the priority level of an unresolved defect ticket based on adding a threshold number of entries citing additional log identifiers. In various examples, the defect analyzer component 114 may escalate a defect ticket based on increasing the priority level, and this increase may be determined independent of time references or dependent on a time frame. For example, the defect analyzer component 114 may increase the priority level of an unresolved defect ticket based on having added over a threshold number (e.g., 1000) of additional logs since the defect ticket was created. In another instance, the defect analyzer component 114 may increase the priority level of an unresolved defect ticket based on adding over a threshold number of additional logs over a time period (e.g., 100 within 24 hours).

In various examples, the defect analyzer component 114 may determine an input defect correlates to but is not a match for an identified defect. As described herein, the defect analyzer component 114 may use a correlation model to correlate input to identified defects and to generate a confidence score for each classification. To correlate defects, the correlation model may analyze the content of the event log in order to identify one or more patterns associated with the defects described by the event log (e.g., comparing similarity in the content of error messages, using time stamps to determine runtime and/or the response time of requests, stack traces, exposed endpoints, etc.). The correlation model may also determine if the two patterns have a strong correlation or a high correlation value. The correlation value may be based on the confidence score generated by a correlation model. As described herein, a low correlation is defined by a confidence score that is at or below a low threshold; a high correlation is defined by a confidence score that is at or above a high threshold; and a strong correlation is defined by a confidence score that is between the high and low threshold.

If an input defect correlates to an identified defect, the defect analyzer component 114 may identify a possible solution for the input defect. The defect analyzer component 114 may interact with the ticketing component 212 to retrieve a defect ticket associated with the identified defect and determine whether the defect ticket is marked resolved. If the identified defect has been resolved, the defect analyzer component 114 may identify a solution for the identified defect as a possible solution for the input defect. The defect analyzer component 114 may indicate the possible solution on the defect ticket generated for the input defect. In some examples, the defect analyzer component 114 may flag the defect ticket for review. Additionally and/or alternatively, if the application associated with the identified defect is in a non-production stage, the present system may serve as a debugger by notifying a developer of the code of the defect ticket. For instance, during the development stage of an application, a developer may be testing a new build of the application. The defect analyzer component 114 may analyze the input defect and indicate a possible solution in the defect ticket and the user portal component 208 may notify the developer about the possible solution in the defect ticket.

The defect analyzer component 114 may continuously train and retrain correlation models. As described herein, the defect analyzer component 114 may create training data for models by identifying sample data from a defects database. The defect analyzer component 114 may use the models to identify a possible solution for the input defect and indicate the possible solution on the defect ticket. The defect analyzer component 114 may flag the defect ticket for review. A user (e.g., application developer) may review the solution and label the ticket with the review results for the possible solution and the review results for this defect ticket may be stored in the defects database. The defect analyzer component 114 may pull new training data from the defects database, and the data, including the review results for this defect ticket, may be used to retrain the models as a continuous feedback loop.

The ticketing component 212 may generate new tickets or entries for input defects. The ticketing component 212 may automatically generate a new defect ticket for new unidentified defects. The ticketing component 212 may generate a new ticket to indicate default information including, but not limited to, low severity level, low priority level, unresolved status, unassigned, etc. The unresolved status may be changed to "resolved" manually by an operator (e.g., developer, tester, etc.) to indicate that the solution documented on the ticket provides a resolution for the defect. The ticketing component 212 may interact with the defect analyzer component 114 to populate the new defect ticket with information extracted from the event log or information gathered from a database. For instance, the ticket component 212 may determine the defect occurred in a particular application and may determine the account assignment for the defects in the particular application. In some examples, the ticketing component 212 may generate a new entry to add to an existing defect ticket for identified defects and add the new entry for log identifiers for identified defects. In some examples, the ticketing component 212 may determine a count of log identifiers associated with the defect ticket exceeds a threshold and may increase a priority level of the defect ticket based at least in part on the count of log identifiers exceeding a predetermined threshold. The ticketing component 212 may store new defect tickets and/or new entries to the tickets in a defects database in the data store 218. The ticketing component 212 may retrieve tickets from the defects database in the data store 218.

In some examples, the ticketing component 212 may perform routine data association and clean-up. The ticketing component 212 may determine based on lack of activity and/or age of a ticket to remove data from a database or move the data to an archive. In various examples, the ticketing component 212 may trigger a routine defects database check to determine if any unresolved defects may have a new correlated resolved defect. For instance, the system may trigger a periodic correlated solutions search (e.g., weekly, bi-weekly, monthly, etc.) to attempt to find potential correlated solutions from a database of resolved defects for unresolved defects. The periodic correlated solutions search may be triggered during slow network traffic hours, including after work hours, weekends, holidays, etc.

The workflow component 214 may determine a task in response to receiving an input event log. As described herein, the workflow component 214 may determine a task based on whether the input defect associated with the input event log is: (1) identified or unidentified; and (2) resolved or unresolved. In some examples, the workflow component 214 may determine the input defect is an unidentified defect and may generate a task entry to review and/or resolve the defect. In some examples, the workflow component 214 may generate a notification regarding the task.

In various examples, the workflow component 214 may determine to append the event log to the identified defect ticket. As described herein, the defect analyzer component 114 may determine whether an input defect is identified and/or resolved. If the input defect is an identified defect, the workflow component 214 may append the event log to the identified defect ticket. If the identified defect is unresolved, the workflow component 214 may determine based on the severity level or priority level of the ticket whether to generate a task for someone to review this ticket. If the identified defect is marked as a resolved defect, the workflow component 214 may have to determine whether a user should be notified based on the error type of the defect. For instance, there may be alerts that trigger event logging even though the event is not related to a defect in the code or the development team has marked the ticket as "do not fix," then the workflow component 214 may determine no more task is needed. If the resolved defect is a high severity defect such as a hard crash, and it is reappearing after it was marked resolved, the workflow component 214 may generate a task for review and generate a notification marked as high priority to escalate the task for review.

In some examples, the workflow component 214 may generate notifications for the new defect tickets or new ticket entries. In additional examples, the workflow component 214 may interact with the user portal component 208 and/or the rules component 210 to determine that the team role to be notified is a project manager and/or a user-designated as task scheduler for the team and push all tasks to the task scheduler's queue for reassignment.

The workflow component 214 may generate tasks based on the user-generated rule that triggered the event log. In various examples, the workflow component 214 may interact with the rules component 210 to determine whether a notification should be generated and published. For instance, a developer for a particular application may create a user-generated rule that triggers an alert, and the rule may specify the notification and the user that should receive the notification. The workflow component 214 may publish the notification to a user account based on the user's team role as described herein. In some examples, the workflow component 214 may interact with the user portal component 208 to determine the preferred communication method and/or notification frequency and send the notification based on the user preference.

The query tool component 116 may generate a user interface to allow a user to browse the defects database. The query tool component 116 may allow a user to search for defects and/or solutions. In some examples, if the current user's access level allows, the user may edit or create tickets to document errors and/or solutions. The query tool component 116 may contact a team member associated with a defect or solution. The query tool component 116 may interact with the user portal component 208 to determine the team role designated as the contact person for a particular application or components team and automatically generate an email to contact the user. In some examples, the query tool component 116 may generate a chatbot to interact with and guide the user. In response to the user input of an error type or message, the chatbot may identify and link a solution. If multiple solutions could be located, the query tool component 116 may select a top-ranked solution based on one or more ranking schemes, including a solution that was referenced the most in tickets, a solution that was confirmed to fix other defects the most, and the like. The query tool component 116 may include a user interface to allow a user to browse the defects database using filters including, but not limited to, dates, applications, error types, keywords, and the like.

In various examples, the present system may train one or more ML model(s) 216 using labeled data as training data. In some examples, initial training data may include samples of data from resolved defects data containing event logs and solutions associated with the defect. In additional and/or alternative examples, the data may be manually classified, reclassified, and/or created by labeling (or tagging) samples of data with various defect information and/or solutions. The labels applied to the samples of data may indicate error types and may indicate the application and/or task dependency based on whether finding a solution for the defect was dependent on resolving a different defect. For example, an event log may be triggered by a frontend user interface element, but the defect was caused by a change in the backend element. In the present example, a crash may appear to be caused by an end-user clicking on a button, but the crash was caused by a null pointer attributable to a change in the backend.

In some examples, the training data may also be labeled with severity and/or priority such as "severity level 1," "high severity," or a score, value, code, that indicates the severity level of the defect. In general, the different types of defects with which the samples of data can be labeled may span a spectrum of severity and/or priority.

Machine learning generally involves processing a set of examples (called "training data") in order to train one or more ML models 216. The model(s) 216, once trained, is a learned mechanism that can receive new data as input and estimate or predict a result as output. Additionally, the model(s) 216 may output a confidence score associated with the predicted result. The confidence score may be determined using probabilistic classification and/or weighted classification. For example, a trained ML model(s) 216 can comprise a classifier that is tasked with classifying unknown input (e.g., an unknown defect) as one of multiple class labels by error types (e.g., exceptions, null pointers, etc.) and defects. In additional examples, the model(s) 216 can be retrained with additional and/or new training data labeled with one or more new defects and/or error types to teach the model(s) 216 to classify unknown input by defects that may now include the one or more new error types and defects. In the context of the present disclosure, the unknown input may include, data that is to be handled according to its level of severity, and the trained ML model(s) 216 may be tasked with classifying the unknown input (a subject for classification) as one of multiple error types with different levels of severity.

In some examples, the trained ML model(s) 216 may classify an input defect as one of the identified defects and determine an associated confidence score. In various examples, if the trained ML model(s) 216 has low confidence (e.g., a confidence score is at or below a low threshold) in its correlation for an unknown defect to an identified defect, this low confidence may return no correlated defect found. An extremely high confidence score (e.g., a confidence score is at or exceeds a high threshold) may indicate the input defect is an exact or near-exact match for an identified defect. If the trained ML model(s) 216 has strong confidence (e.g., a confidence score is above a low threshold but below a high threshold) in the correlation but the defect is not an exact or near-exact match, the system may still return the correlated defect and any correlated solution and may link them to the new defect ticket as possible solution found. After the correlated solution has been applied and/or a similar fix has been applied to resolve or not resolve the new defect, the data with the correlated solution may be labeled as correct or incorrect correlation, the data may be used as additional training data to retrain the model(s) 216. Thus, the system may retrain the ML model(s) 216 with the additional training data to generate the new ML model(s) 216. The new ML model(s) 216 may be applied to new input data as a continuous retraining cycle to improve the classifier.

The ML model(s) 216 may represent a single model or an ensemble of base-level ML models and may be implemented as any type of model(s) 216. For example, suitable ML model(s) 216 for use with the techniques and systems described herein include, without limitation, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof An "ensemble" can comprise a collection of model(s) 216 whose outputs (classifications) are combined, such as by using weighted averaging or voting. The individual ML models of an ensemble can differ in their expertise, and the ensemble can operate as a committee of individual ML models that is collectively "smarter" than any individual machine learning model of the ensemble.

The data store 218 may store at least some data including, but not limited to, data collected from the communications component 206, the error documentation component 112, and the model(s) 216, including data associated with team data, event logs, defects data, and training data. In some examples, the data may be automatically added via a computing device (e.g., device(s) 102, server(s) 104). Team data may include user data and may correspond to one or more users with error documentation access. In various examples, user data may include information associated with the user, such as the name, preferred contact information, notification settings and subscriptions, assigned application team(s), and associated team role(s), etc. Event logs may include the data received in association with error events triggered on applications running on end-user devices and may include log identifiers. Defects data may include data used by the system to document errors and solutions, including the tickets and defect information and/or any look-up table generated for the notification system. Training data may include any portion of the data in the data store 218 that is selected to be used to train one or more ML models. In additional and/or alternative examples, at least some of the data may be stored in a storage system or other data repository.

Figure 3:
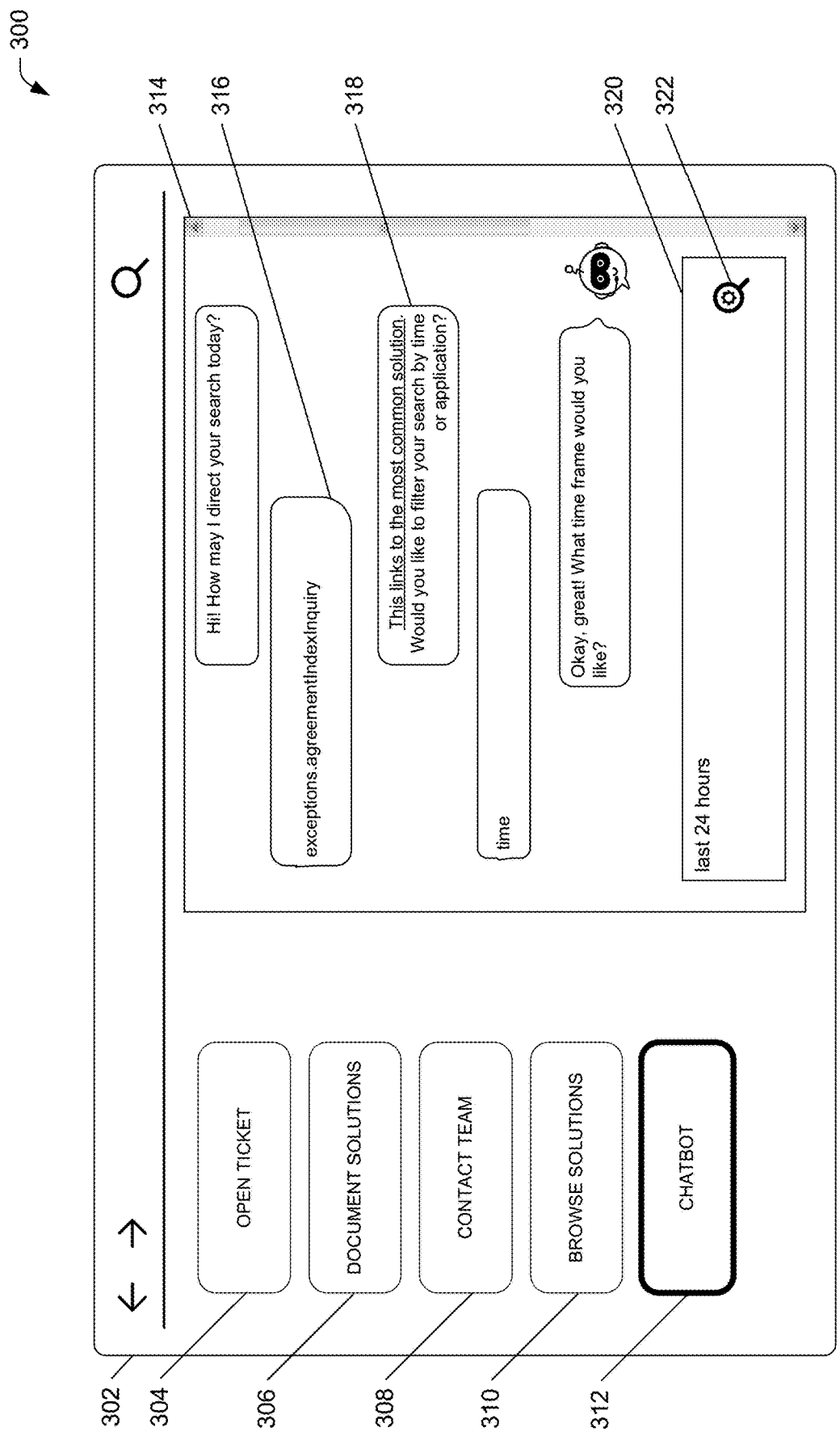
FIG. 3 illustrates an example user interface of the present disclosure.

FIG. 3 illustrates example user interfaces (UI) 300 of a device implementing the error documentation component, as discussed herein. In some instances, the example UI 300 may present a user interface including an example navigation window 302 and associated components to interface with the error documentation system. The example navigation window 302 may include example UI buttons 304, 306, 308, 310, and 312, and an example chatbot window 314.

As a non-limiting example, the query tool component 116 may generate the example navigation window 302 and associated components to allow a user to interact with the error documentation system, including open defect tickets, document solutions, and search for defects and/or solutions. The example navigation window 302 may include navigation elements for the system. The example UI buttons 304, 306, 308, 310, and 312 may present different user interactions available to the current user account. In some examples, if the user account has access privilege, the operator may edit or create tickets to document errors and/or solutions.

The example user interaction button 304 includes an option to open a ticket. In some examples, the system may allow a user to open a ticket. In some examples, if the current user's access level allows, the user may open, edit, and/or create tickets.

The example user interaction button 306 includes an option to document solutions. In some examples, if the current user's access level allows, the user may edit tickets to document solutions. The query tool component 116 may present tickets with suggested solutions that are flagged for review, and the user may provide the requested review and document whether the suggested solution was a valid solution for the defect. For instance, the user may open a ticket and fix the defect using a suggested solution or a different solution that the user came up with and documented. After determining the defect has been fixed, the user may mark the ticket as "resolved."

The example user interaction button 308 includes an option to contact a team. In response to a selection of the example user interaction button 308, indicated by to "contact team," the query tool component 116 may interact with the user portal component 208 to trigger an email window to contact a team member associated with a defect or solution. The query tool component 116 may interact with the user portal component 208 to determine the team role designated as the contact person for a particular application or components team and automatically generate an email to contact the user.

The example user interaction button 310 includes an option to browse solutions. In response to a selection of the example user interaction button 310, the query tool component 116 may trigger a window to browse documented solutions for defects manually without the guidance of the chatbot. The query tool component 116 may include a user interface to allow a user to browse the defects database using filters including, but not limited to, dates, applications, error types, keywords, and the like.

The example user interaction button 312 indicates the current user interaction as selected by the user is "CHATBOT." In some examples, the example user interaction buttons 312 may present the example chatbot window 314 to browse solutions and/or tickets based on selection.

In the present example, the example chatbot window 314 may include an example user-chatbot interaction and may include an example user input 316, an example chatbot output 318, an example user input window 320, and an example search filter button 322. The example chatbot window 314 may provide a chatting interface for the user to interact with the chatbot to search the defects database. The example user input 316 indicates the user input "exceptions.agreementIndexInquiry" as the error to search for. In response to the user input of an error type or message, the chatbot may identify and link a solution. If multiple solutions could be located, the query tool component 116 may select a top-ranked solution based on one or more ranking schemes, including a solution that was referenced the most in tickets, a solution that was confirmed to fix other defects the most, and the like. In some examples, the example chatbot output 318 may present the solution as a hyperlink to the ticket in response to user input. In an additional example, the example chatbot output 318 may also include guidance to help the user filter the search results if there is more than one solution found.

The example user input window 320 may receive user input to perform a search or filter the search. Although the example chatbot output 318 may help the user refine their search by asking the user-specific filtering question, the user may also filter their search by selecting the example search filter button 322.

Figure 4:
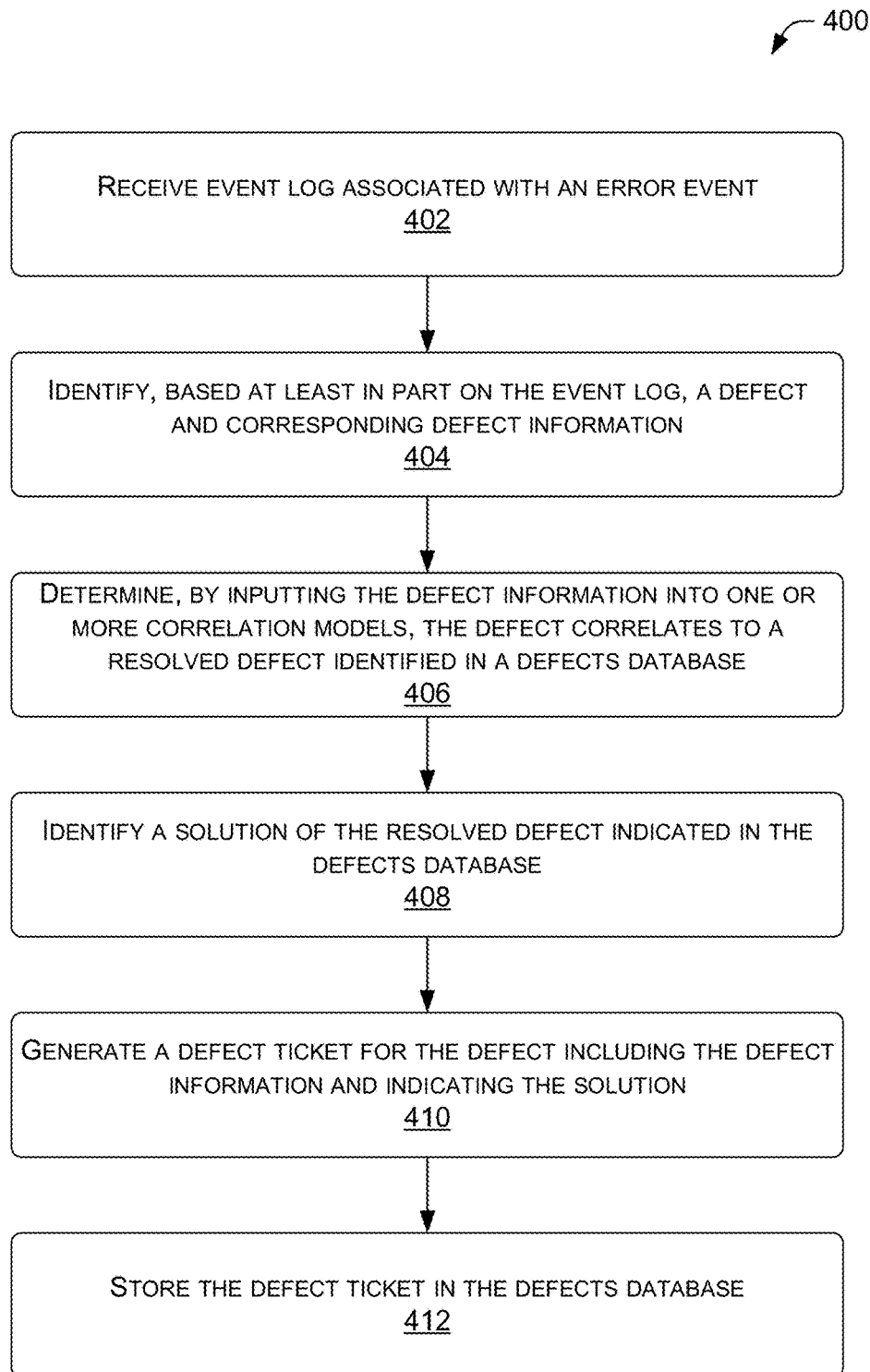
FIG. 4 illustrates an example process for generating a defect ticket to request a solution, as discussed herein.
Figure 5:
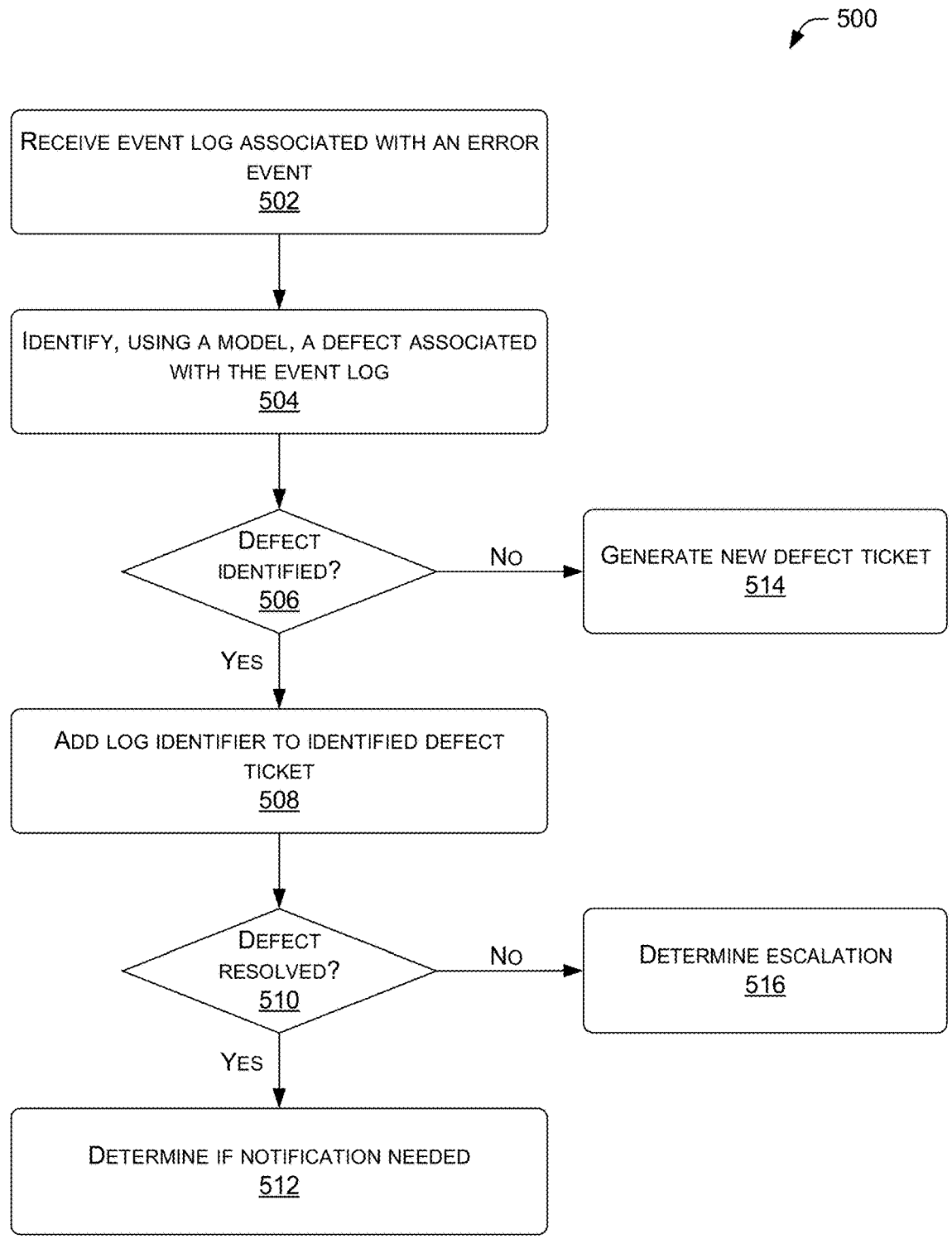
FIG. 5 illustrates an example defect handling process, as discussed herein.
Figure 6:
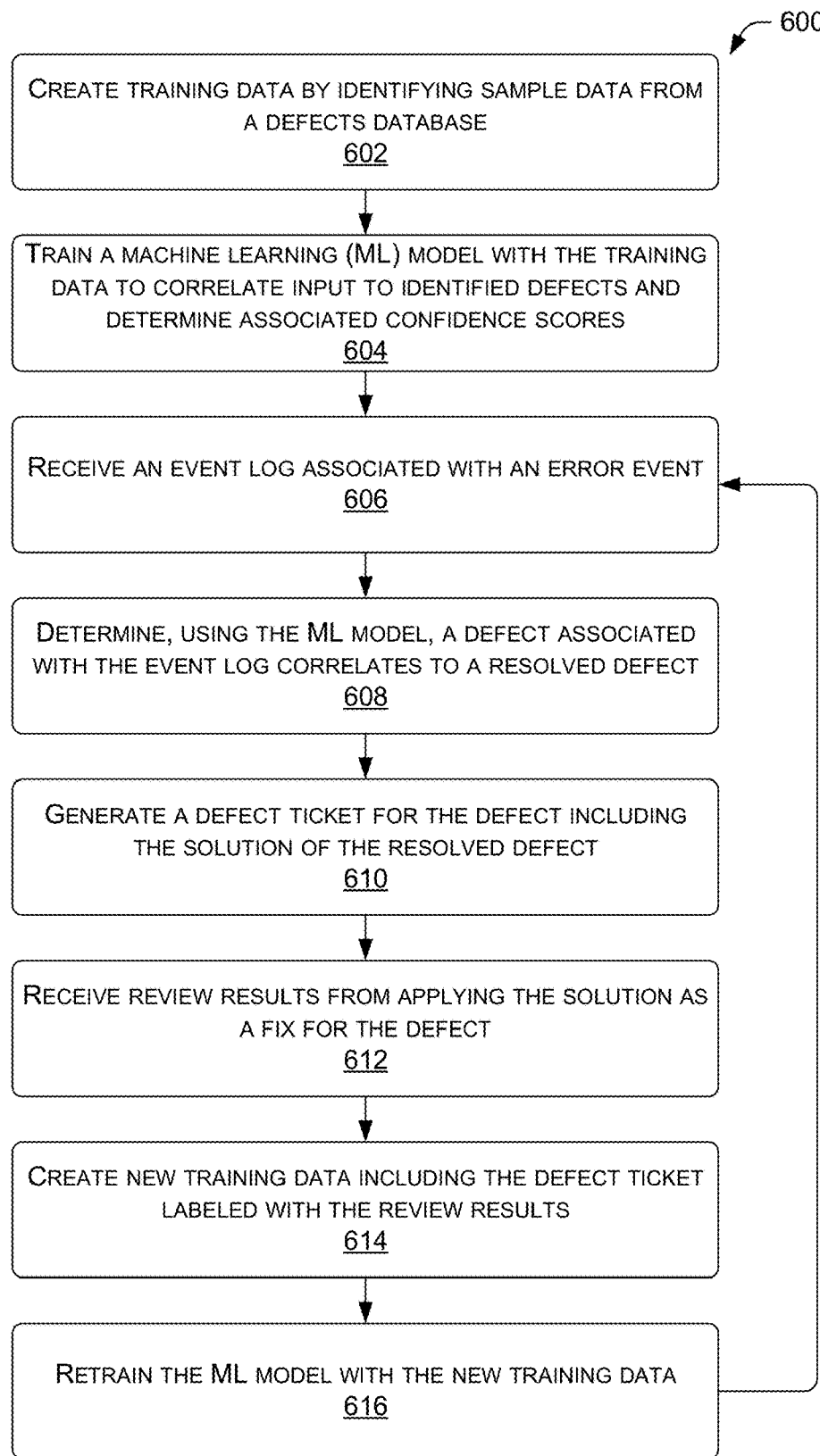
FIG. 6 illustrates an example process for training ML models, as discussed herein.

FIGS. 4, 5, and 6 are flow diagrams of illustrative processes. The processes are illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 4 is a flow diagram of an illustrative process 400 for receiving data logged in response to an error event and generating an issue ticket to request a solution. The process 400 is described with reference to the system 100 and may be performed by the server(s) 104. Of course, the process 400 may be performed in other similar and/or different environments.

At 402, the system 100 may receive an event log associated with an error event. As described herein, the communication component 206 can include functionality to conduct communications with one or more other devices to collect data. The communication component 206 can be configured to receive data (e.g., event logs) directly from an end-user device and/or receive data stored in an interim data repository. In some examples, the communication component 206 can include functionality to serve as a logging tool. The logging tool may include webhook functionality and may receive data stream, representative of metrics logged from error events triggered on the device(s) 102 via a communication session on the network(s) 106. The error events may be triggered by computer errors (e.g., null pointers, code exceptions, etc.) or triggered by preconfigured rules for alerts. The preconfigured rules may include rules generated by operators (e.g., software developers) to track specific events occurring on their application. In response to the error event, the logging tool may log metrics from the applications running on end-user devices and may push the metrics to a server and/or data repository for analysis. In additional examples, the communication component 206 can be configured to receive stored event logs from a data repository.

At 404, the system 100 may identify, based at least in part on the event log, a defect and corresponding defect information. As described herein, defect analyzer component 114 may analyze the event log and identify the defect from the event log. In some examples, defect analyzer component 114 may parse the event log and extract relevant defect information from the event log. For example, an event log may include an error message and/or stack trace, and the defect analyzer component 114 may parse the strings of the error message and/or stack trace for error code, tags, and/or other indicators. In some examples, the defect analyzer component 114 may infer additional relevant defect information based on the extracted information using look-up tables and/or ML models. The relevant defect information may include any information included on a defect ticket that helps guide development team members to document defects and solutions. For instance, the extracted information may include identifying the error type (e.g., code exceptions, null pointers, SDK issues, etc.), the error message, stack trace, exposed endpoint, application and/or application component that triggered the alert, end-user device type, operating system, and the like. The inferred information may include identifying related and/or dependent applications, defect identifier, severity level, priority level, tasks, correlated defects, correlated solutions, and the like.

At 406, the system 100 may determine, by inputting the defect information into one or more correlation models, the defect correlates to a resolved defect identified in a defects database. As described herein, the defect analyzer component 114 may use the event log and/or extracted information to determine whether the associated defect matches or correlates to an existing identified defect from a defects database. In some examples, the defect analyzer component 114 may train and use one or more correlation models to correlate an input defect to a defect identified in a defects database. As described herein, the defect analyzer component 114 may determine an input defect correlates to but is not a match for an identified defect. The defect analyzer component 114 may use a correlation model to correlate input to identified defects and to generate a confidence score for each classification. To correlate defects, the correlation model may analyze a pattern of the content of the event log with respect to patterns of the identified defects (e.g., comparing similarity in the content of error messages, stack traces, exposed endpoints, etc.) and determine if the two patterns have a strong correlation. A strong correlation is defined by a confidence score that is between a high and low threshold. The defect analyzer component 114 may interact with the ticketing component 212 to retrieve a defect ticket associated with the identified defect and determine whether the defect ticket is marked resolved.

At 408, the system 100 may identify a solution of the resolved defect indicated in the defects database. If an input defect correlates to a resolved defect, the defect analyzer component 114 may identify a possible solution for the input defect. The defect analyzer component 114 may interact with the ticketing component 212 to retrieve a defect ticket associated with the identified defect and determine whether the defect ticket is marked resolved. If the identified defect has been resolved, the defect analyzer component 114 may identify a solution for the identified defect as a possible solution for the input defect.

At 410, the system 100 may generate a defect ticket for the defect including the defect information and indicating the solution. The ticketing component 212 may automatically generate a new defect ticket for new unidentified defects. The ticketing component 212 may interact with the defect analyzer component 114 to populate the new defect ticket with information extracted from the event log or information gathered from a database. As described herein, the defect analyzer component 114 may identify a solution for the identified defect as a possible solution for the input defect. The defect analyzer component 114 may indicate the possible solution on the defect ticket generated for the input defect.

At 412, the system 100 may store the defect ticket in the defects database. The ticketing component 212 may store new defect tickets and/or new entries to the tickets in a defects database in the data store 218.

FIG. 5 is a flow diagram of an illustrative process 500 for receiving input event log and determining defect handling process based on whether it was identified and/or resolved. The process 500 is described with reference to the system 100 and may be performed by the server(s) 104. Of course, the process 500 may be performed in other similar and/or different environments.

At 502, the system 100 may receive an event log associated with an error event. As described herein, the communication component 206 can include functionality to conduct communications with one or more other devices to collect data. The communication component 206 can be configured to receive data (e.g., event logs) directly from an end-user device and/or receive data stored in an interim data repository. In some examples, the communication component 206 can include functionality to serve as a logging tool. The logging tool may include webhook functionality and may receive data stream, representative of metrics logged from error events triggered on the device(s) 102 via a communication session on the network(s) 106. The error events may be triggered by computer errors (e.g., null pointers, code exceptions, etc.) or triggered by preconfigured rules for alerts. The preconfigured rules may include rules generated by operators (e.g., software developers) to track specific events occurring on their application. In response to the error event, the logging tool may log metrics from the applications running on end-user devices and may push the metrics to a server and/or data repository for analysis. In additional examples, the communication component 206 can be configured to receive stored event logs from a data repository.

At 504, the system 100 may identify, using a model, a defect associated with the event log. As described herein, the defect analyzer component 114 may analyze the event log and identify the defect from the event log. In some examples, defect analyzer component 114 may parse the event log and extract relevant defect information from the event log. In some examples, the defect analyzer component 114 may infer additional relevant defect information based on the extracted information using look-up tables and/or ML models.

At 506, the system 100 may determine whether the defect was identified. As described herein, the defect analyzer component 114 may determine whether the defect has previously been identified or not. In some examples, the defect analyzer component 114 may interact with the ticketing component 212 to store and/or retrieve data or tickets from a defects database. The defect analyzer component 114 may use the event log and/or extracted information to determine whether the associated defect matches or correlates to an existing identified defect from a defects database. In various examples, the defect analyzer component 114 may use one or more models to classify input by known defects and to generate a confidence score for each classification. The one or more models may determine whether there is a matching or correlated defect from the database based on models that perform simple match and/or pattern correlation. For example, a matching model may perform a simple match by comparing strings in defects information, including application identifier, the error message header, the error type, and the like. In an additional example, a correlation model may perform pattern correlation by comparing the patterns of an input defect with identified defects (e.g., comparing similarity in the content of error messages, stack traces, exposed endpoints, etc.) and may generate a confidence score for each correlation. In the present example, the defect analyzer component 114 may determine an input defect is a match for an identified defect if the generated confidence score is at or above a high threshold. The defect analyzer component 114 may determine the input defect fails to match any identified defect, and the ticketing component 212 may generate a new defect ticket for the input defect.

At 508, the system 100 may, in response to process 506 determining the defect matching an identified defect, add a log identifier associated with the event log to a ticket associated with the identified defect. As described herein, in response to identifying a defect as a match for an existing identified defect, the defect analyzer component 114 may retrieve the ticket for the identified defect and append the event log to the defect ticket by adding an entry indicating the log identifier associated with the event log. The defect analyzer component 114 may also determine from the defect ticket if the ticket was marked resolved with a solution or if the ticket was unresolved.

At 510, the system 100 may determine whether the identified defect is resolved. As described herein, the defect analyzer component 114 may determine from the defect ticket if the ticket was marked resolved with a solution or if the ticket was unresolved.

At 512, the system 100 may, in response to the identified defect being resolved, determine if a notification is needed. As described herein, if a defect ticket was marked resolved, the defect analyzer component 114 may determine if the ticket needs to be reopened based on the number of new defects added since the ticket was marked resolved. For instance, if a ticket was marked resolved, the defect should have been fixed, but if the defect analyzer component 114 adds a number of entries for new event logs above a threshold number to this ticket, the ticket may be reopened for defect review. In some examples, a ticket may be marked as "Do Not Fix" by a team member, and the ticket will not be reopened for defect review. The ticket marked as "Do Not Fix" may include defects deemed not worth fixing or may be dependent on a fix from a different software component.

At 514, the system 100 may, in response to process 506 determining the defect is an unidentified defect, generate a new defect ticket. The ticketing component 212 may automatically generate a new defect ticket for new unidentified defects. The ticketing component 212 may interact with the defect analyzer component 114 to populate the new defect ticket with information extracted from the event log or information gathered from a database. The ticketing component 212 may store new defect tickets in a defects database in the data store 218.

At 516, the system 100 may, in response to process 510 determining the identified defect is unresolved, determine if the ticket associated with the identified defect needs to be escalated. The defect analyzer component 114 may increase the priority level of an unresolved defect ticket based on adding a threshold number of entries citing additional log identifiers. In various examples, the defect analyzer component 114 may escalate a defect ticket based on increasing the priority level, and this increase may be determined independent of time references or dependent on a time frame.

FIG. 6 is a flow diagram of an illustrative process 600 for training ML models to classify input data to correlated defects and to retrain the ML models. The process 600 is described with reference to the system 100 and may be performed by the server(s) 104 and/or in cooperation with any one or more of the device(s) 102. Of course, the process 600 may be performed in other similar and/or different environments.

At 602, the system 100 may create training data by identifying sample data from a defects database. The defect analyzer component 114 may train and use one or more correlation models to correlate an input defect to a defect identified in a defects database. As described herein, the defect analyzer component 114 may create training data for ML models by identifying sample data from a defects database.

At 604, the system 100 may train a machine learning (ML) model with the training data to correlate input to identified defects and determine associated confidence scores. As described herein, the defect analyzer component 114 may create training data for ML models by identifying sample data from a defects database. The trained machine learning (ML) model can comprise a classifier that is tasked with classifying input data (e.g., event log with unknown defect) by known defects (e.g., identified defects from a defects database) and may generate a confidence score for the classification. The classifying may include pattern correlating, as described herein. The confidence score is generated by the trained ML model based on the classification method used and indicates a statistical likelihood of correct classification. Accordingly, a low confidence score, defined by a confidence score that is at or below a low threshold, may indicate a low correlation; a high confidence score, defined by a confidence score that is at or above a high threshold, may indicate a high correlation (e.g., statistical likelihood for a near or exact match); and a confidence score that is between the high and low threshold may indicate a strong correlation but not a near or exact match.

At 606, the system 100 may receive an event log associated with an error event. The system 100 may perform functions similar to the process 402, as described herein.

At 608, the system 100 may determine, using the ML model, a defect associated with the event log correlates to a resolved defect. As described herein, the defect analyzer component 114 may use a correlation model to correlate input to identified defects and to generate a confidence score for each classification. To correlate defects, the correlation model may analyze a pattern of the content of the event log with respect to patterns of the identified defects (e.g., comparing similarity in the content of error messages, stack traces, exposed endpoints, etc.) and determine if the two patterns have a strong correlation or a high correlation value. The correlation value may be based on the confidence score generated by a correlation model. As described herein, a low correlation is defined by a confidence score that is at or below a low threshold; a high correlation is defined by a confidence score that is at or above a high threshold, and a strong correlation is defined by a confidence score that is between the high and low threshold. The defect analyzer component 114 may interact with the ticketing component 212 to retrieve a defect ticket associated with the identified defect and determine whether the defect ticket is marked resolved.

At 610, the system 100 may generate a defect ticket for the defect including the solution of the resolved defect. The system may perform functions similar to the process 410, as described herein.

At 612, the system 100 may receive review results from applying the solution as a fix for the defect. The defect analyzer component 114 may use the models to identify a possible solution for the input defect and indicate the possible solution on the defect ticket. The defect analyzer component 114 may flag the defect ticket for review. A user (e.g., application developer) may review the solution and label the ticket with the review results for the possible solution, and the review results for this defect ticket may be stored in the defects database.

At 614, the system 100 may create new training data to include the defect ticket labeled with the review results. The defect analyzer component 114 may flag the defect ticket for review. A user (e.g., application developer) may review the solution and label the ticket with the review results for the possible solution, and the review results for this defect ticket may be stored in the defects database. The defect analyzer component 114 may pull new training data from the defects database, and this data from the newly resolved defects may be used to retrain the models as a continuous feedback loop.

At 616, the system 100 may retrain the ML model with the new training data. The defect analyzer component 114 may continuously train and retrain correlation models. As described herein, the defect analyzer component 114 may create training data for models by identifying sample data from a defects database. The defect analyzer component 114 may flag the defect ticket for review. A user (e.g., application developer) may review the solution and label the ticket with the review results for the possible solution, and the review results for this defect ticket may be stored in the defects database. The defect analyzer component 114 may pull new training data from the defects database, and the data including the review results for this defect ticket may be used to retrain the models as a continuous feedback loop. Accordingly, the process 616 may return to process 606 to receive a new event log and retrain the model(s) to continuously improve the model(s) in this data processing loop.

CONCLUSION

The techniques and systems described herein improve existing error documentation technologies and related systems. In particular, the communications component 206 gathers event logs from end-user devices. The defect analyzer component 114 analyzes an event log to identify the defect and defect information. Moreover, the defect analyzer component 114 may train ML models to correlate input defect to identified defects based on patterns and may suggest probable solutions based on solutions identified in the identified defect. The ticketing component 212 automatically generates tickets for new defects and populates the tickets with defect information. By correlating defect data, the error documentation component 112 and associated components improve the error documentation process by timely analyzing and identifying defects from input data, automatically generating defect tickets, and populating the tickets with information extracted from the input data, including any correlated defects and/or solutions. The ticketing component 212 can reduce costly development time associated with ticket writing and information gathering. The workflow component 214 can further reduce costly development time by notifying the appropriate application team and/or developer of defects found. Additionally, the query tool component 116 may receive query inputs and share documented resolutions across the different application teams.

It should be appreciated that the subject matter presented herein can be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations can be performed in combination with other types of program components. Generally, program components include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program components can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
a non-transitory computer-readable media storing a plurality of software components that, when executed by the one or more processors, cause the one or more processors to perform operations comprising:
receiving, from one or more computing devices, an event log associated with an error event, the event log including data logged in response to the error event triggered on an application;
identifying, based at least in part on the event log, a defect and defect information corresponding to the defect;
determining, by inputting the defect information into one or more machine learning (ML) models, the defect correlates to an unresolved defect identified in a defects database;
identifying a defect ticket associated with the unresolved defect;
determining, by an error documentation component of the plurality of software components, to generate a log identifier to associate the defect with the defect ticket;
generating, by the error documentation component, the log identifier for the defect and indicating the log identifier on the defect ticket;
receiving confirmation that the one or more ML models correctly determined that the defect correlates to the unresolved defect;
receiving a solution for the defect ticket;
creating training data that includes the defect ticket, the solution, and the confirmation; and
retraining the one or more ML models using the training data.

2. The system of claim 1, the operations further comprising:
receiving, from the one or more computing devices, an additional event log associated with an additional error event;
determining an additional defect associated with the additional event log is correlated to the defect; and
generating a second log identifier to associate the additional defect with the defect ticket.

3. The system of claim 2, the operations further comprising:
determining that a count of log identifiers, associated with the defect ticket, exceeds a threshold; and
increasing a priority level of the defect ticket based at least in part on the count of log identifiers exceeding the threshold.

4. The system of claim 1, the defect information including one or more of:
an error type, an error message, a sequence log, a response time of a request, a sequence code, a stack trace, an exposed endpoint, an application identifier, a stage of development cycle, and a severity level.

5. The system of claim 1, the operations further comprising:
generating a task to request review of the defect ticket;
generating a notification for the task;
publishing the notification to a subscriber of events associated with the application; and
sending the notification to a device associated with the subscriber.

6. The system of claim 5, wherein determining the defect correlates to the unresolved defect includes:
generating a confidence score associated with the defect correlating to the unresolved defect; and
determining the confidence score is above a threshold.

7. The system of claim 1, the operations further comprising:
receiving a query indicating one of an error type or an error message; and
retrieving, from the defects database, one or more solutions associated with the query.

8. A method, comprising:
training a machine learning (ML) model with training data to correlate input data to identified defects;

receiving an event log associated with an error event, the event log including data logged in response to the error event, and the error event being detected on an application;

identifying, based at least in part on the event log, a defect and defect information corresponding to the defect;

determining, by inputting the defect information into the ML model, the defect correlates to an identified defect from a defects database;

determining, by an error documentation component of the plurality of software components, to generate a defect ticket to associate the defect with the identified defect;

generating, by the error documentation component of the plurality of software components, the defect ticket for the defect and indicating a solution of the identified defect;

receiving a review result for applying the solution to the defect; and training a second ML model with new training data including the defect ticket labeled with the review result.

9. The method of claim 8, wherein indicating the solution comprises identifying the solution of the identified defect indicated in the defects database.

10. The method of claim 9, further comprising:
generating a task to request review for the solution on the defect ticket;
receiving the review result that indicates applying the solution failed to fix the defect; and
creating the new training data that includes the defect ticket, the solution, and the review result.

11. The method of claim 9, further comprising:
generating a task to request review for the solution on the defect ticket;
receiving confirmation that the solution is a resolution for the defect; and
creating the new training data that includes the defect ticket, the solution, and the confirmation.

12. The method of claim 11, further comprising:
indicating a resolve status on the defect ticket;
storing the defect ticket in the defects database; and
generating a user interface including a query tool for the defects database.

13. The method of claim 8, the defect information indicating a high severity level and further comprising:
generating a high alert notification for the defect ticket based at least in part on the high severity level; and
pushing the high alert notification to at least one user account having a lead team role associated with the application.

14. The method of claim 8, the event log associated with the error event being received in real-time or in near real-time, and further comprising:
determining, based at least in part on the defect information, a developer identifier associated with the error event and a stage of development cycle is associated with a development stage; and
pushing a high alert notification to at least a user account associated with the developer identifier.

15. One or more non-transitory computer-readable media storing computer executable instructions that, when executed, cause one or more processors to perform operations comprising:
creating training data by identifying sample data from a defects database;
training a machine learning (ML) model with the training data to correlate input to identified defects;
receiving an event log;
determining, using the ML model, a defect associated with the event log correlates to an identified defect from the defects database;
determining, by an error documentation component of the plurality of software components and based at least in part on the defection correlating to the identified defect, to generate a defect ticket to associate the defect with the identified defect;
generating, by the error documentation component of the plurality of software components, the defect ticket for the defect with information including a solution of the identified defect indicated in the defects database;
receiving review results for applying the solution to the defect; and
training a second ML model with new training data including the defect ticket labeled with the review results.

16. The one or more non-transitory computer-readable media of claim 15, wherein the operations further comprise:
receiving an additional event log;
determining, using the second ML model, an additional defect associated with the additional event log fails to correlate to a second identified defect from the defects database; and
generating an additional defect ticket for the additional defect.

17. The one or more non-transitory computer-readable media of claim 15, wherein the operations further comprise:
receiving an additional event log;
determining, using the second ML model, an additional defect associated with the additional event log is a match for a second identified defect from the defects database;
retrieving a second defect ticket for the second identified defect from the defects database;
generating a log identifier for the additional event log; and
indicating the log identifier on the second defect ticket.

18. The one or more non-transitory computer-readable media of claim 15, wherein the operations further comprise:
receiving an additional event log;
determining, using the second ML model, an additional defect associated with the additional event log correlates to a second identified defect from the defects database;
retrieving a second defect ticket for the second identified defect from the defects database;
determining a severity level of the additional defect is high based at least in part on the second defect ticket indicating a high severity level; and
generating an additional defect ticket for the additional defect indicating the high severity level.

19. The one or more non-transitory computer-readable media of claim 18, wherein the operations further comprise:
generating a high alert notification for first subscribers of events for a first application associated with the second identified defect and second subscribers of events for a second application associated with the additional defect.

20. The one or more non-transitory computer-readable media of claim 15, wherein the defects database includes a first database associated with a first development team and a second database associated with a second development team, and the operations further comprise:
determining, based at least in part on the defect information, the event log is generated by a first application associated the first development team; and determining that the solution of the identified defect is associated with a second application of the second development team.

* * * * *